United States Patent
Galán Marquez et al.

(10) Patent No.: US 8,111,632 B2
(45) Date of Patent: Feb. 7, 2012

(54) METHOD FOR LOGICAL DEPLOYMENT, UNDEPLOYMENT AND MONITORING OF A TARGET IP NETWORK

(75) Inventors: Fermin Galán Marquez, Castelldefels (ES); Raul Muñoz Gonzalez, Castelldefels (ES)

(73) Assignee: Fundacio Privada Centre Tecnologic De Telecomunicacions De Catalunya, Castelldefels (Barcelona) (ES)

( * ) Notice: Subject to any disclaimer, the term of this patent is extended or adjusted under 35 U.S.C. 154(b) by 293 days.

(21) Appl. No.: 12/445,687

(22) PCT Filed: Oct. 16, 2006

(86) PCT No.: PCT/EP2006/009960
§ 371 (c)(1),
(2), (4) Date: Apr. 15, 2009

(87) PCT Pub. No.: WO2008/046429
PCT Pub. Date: Apr. 24, 2008

(65) Prior Publication Data
US 2010/0309812 A1 Dec. 9, 2010

(51) Int. Cl.
*H04L 12/28* (2006.01)
(52) U.S. Cl. ........................ 370/254; 370/255
(58) Field of Classification Search .................. None
See application file for complete search history.

(56) References Cited

U.S. PATENT DOCUMENTS

| | | | | |
|---|---|---|---|---|
| 6,085,234 A | * | 7/2000 | Pitts et al. | 709/217 |
| 7,411,940 B2 | * | 8/2008 | Gass | 370/352 |
| 7,895,299 B2 | * | 2/2011 | Betts et al. | 709/220 |
| 2002/0178252 A1 | * | 11/2002 | Balabhadrapatruni et al. | 709/223 |
| 2004/0085359 A1 | | 5/2004 | Steg et al. | |
| 2004/0117452 A1 | | 6/2004 | Lee et al. | |
| 2005/0138019 A1 | * | 6/2005 | Betts et al. | 707/3 |
| 2006/0075094 A1 | * | 4/2006 | Wen et al. | 709/224 |
| 2006/0114889 A1 | * | 6/2006 | Schneider et al. | 370/352 |
| 2006/0168282 A1 | * | 7/2006 | Turner et al. | 709/230 |
| 2008/0244028 A1 | * | 10/2008 | Le et al. | 709/208 |

OTHER PUBLICATIONS

International Search Report and Written Opinion dated Aug. 6, 2007 from the corresponding PCT/EP2006/009960.

(Continued)

*Primary Examiner* — Anthony Sol
(74) *Attorney, Agent, or Firm* — Katten Muchin Rosenman LLP (57) ABSTRACT

The method is applied to configure, reconfigure and monitor globally a plurality of network elements ($NE_1, \ldots, NE_i, \ldots, NE_j, \ldots, NE_N$) connected to an IP Network (10) through multiple interfaces ($A_1, \ldots, A_N$), with several Network Elements Controllers ($NEC_1, \ldots, NEC_k, \ldots, NEC_Q$) connected to the same IP Network (10) through respective interfaces ($B_1, \ldots, B_Q$). The IP Network (10) also provides a plurality of preconfigured IP functional interfaces ($C_{ik}$) from each network element ($NE_i$) to the at least one network elements controller ($NEC_k$). Each network element ($NE_i$) has an IP networking layer (9) and runs/executes several network-related processes ($P_1, \ldots, P_L$) managed and monitored by this method. The method also provides configuration and monitoring of IP interfaces ($D_{ij}$) among network elements. The existing IP functional interfaces ($C_{ik}$) are used to perform such managing and monitoring. To get these aims, the method performs high-level actions instead of atomic "get/set" operations. Neither the method neither requires explicit agents-manager paradigm nor depends on a particular communication protocol for network management.

15 Claims, 8 Drawing Sheets

OTHER PUBLICATIONS

Hosoon Ku et al: "Web-based Configuration Management Architecture for Router Networks", Apr. 10, 2000, pp. 173-186, XP010376682, abstract Chapter 1-4 on pp. 173-p. 184.

International Preliminary Report on Patentability from the corresponding PCT/EP2006/009960.

D. Harrington, R. Presuhn, B. Wijnen, "An Architecture for Describing Simple Network Management Protocol (SNMP) Management Frameworks", IETF Standard 62, RFC 3411, Dec. 2002.

Web Based Enterprise Management (WBEN), Distributed Management Task Force, "Specification of CIM Operations over HTTP", Version 1.1, DMTF Standard DSP0200, Dec. 9, 2004.

Model Driven Architecture (MDA) framework, Object Management Group, "MDA Guide Version 1.0.1", OMG Document No. omg/2003-06-01, Jun. 2003.

TCP/IP Illustrated, vol. 1: The Protocols, by W. Richard Stevens, Addison-Wesley, Chapter 1.2, p. 2, 1994.

* cited by examiner

METHOD FOR LOGICAL DEPLOYMENT, UNDEPLOYMENT AND MONITORING OF A TARGET IP NETWORK

FIELD OF THE INVENTION

The present invention is applied generally to the field of telecommunication networks and more particularly this invention relates to configuration, reconfiguration and monitoring of network nodes in networks providing Internet Protocol (IP) connectivity.

More precisely, the present invention discloses a method for simplifying the task of logical deployment to configure a target IP network topology which is to be physically deployed on a background IP network, as well as the inverse task of logical undeployment is simplified. Furthermore, this method allows real time monitoring on the network elements previously deployed in, the target IP network.

STATE OF THE ART

Conventional management systems, such as Simple Network Management Protocol (SNMP) [D. Harrington, R. Presuhn, B. Wijnen, "An Architecture fot Describing Simple Network Management. Protocol (SNMP) Management Frameworks", IETF Standard 62, RFC 3411, December 2002] or Web Based Enterprise. Management (WBEN) [Distributed Management Task Force, "Specification of CIM Operations over HTTP", Version 1.1, DMTF Standard DSP0200, January 2003]) are based on two functional entities: agents and managers. Agents run in the devices that are being managed and are aware of the internal information and parameters needed for management. Managers connect to agents in order to perform management operations.

The communication between agents and managers is based in an information model, that is, a structured way of describing the management data (for example, CPU load, IP addresses, etc.) and a communication protocol to exchange that information. For example, in the case of SNMP management framework, with SNMP as the communication protocol, the information model is composed of MIBs (Management Information Base) defined in a standardized text-based information structured language called ASN.1 (Abstract Syntax Notation 1).

However, these management systems have some drawbacks for the deployment of global configurations involving several network elements in IP networks. On the one hand, they are very strict in terms of requirements of communication protocol and information model, which are described as part of the management system. Said communication protocol and information model are often incompatible with the communication interfaces of devices provided by certain vendors. On the other hand, well-known management systems provide very simple management operations ("get" and "set" in most of the cases), which make said systems unsuitable for complex configurations. Moreover, when using these well-known management systems, each network element is managed individually, and therefore the management system does not have a global view of the whole network to be configured.

Solutions to these problems usually, rely on building top-level manager applications, which act as front-ends of the network management system. However, these applications are difficult to design and implement.

In addition, a currently widely used industrial standard for data interchange is the eXtensible Markup Language (XML). XML is a World Wide Web Consortium-recommended general-purpose markup language for creating special-purpose markup languages. It is a simplified subset of the Standard Generalized Markup Language (SGML). The primary purpose of XML is to facilitate the sharing of data across different systems, particularly systems connected via the Internet. Many languages based on XML (for example, Geography Markup Language (GML), RDF/XML, RSS, Atom, MathML, XHTML, SVG, Klip and MusicXML) are defined in a formal way, allowing programs to modify and validate documents in these languages without prior knowledge of their particular form.

Network management systems based on XML are described in US 2004/0117452 A1. In particular, US 2004/0117452 A1 describes a network management system and method which employs tree-shaped configurations for individually managed network elements.

With the aim at simplifying the network management, it would be desirable to provide a straightforward data model that defines the global network configuration and eases its management globally, instead of having managed the individual network elements, without being tied to a particular Configuration of each network element.

The model-focused approach has been already successfully applied to other engineering fields, such as software production in the Model Driven Architecture (MDA) framework, [Object Management Group, "MDA Guide Version 1.0.1", OMG Document Number omg/2003-06-01, June 2003], based on technology-agnostic models of software applications and processing these models in order to build platform-dependent code implementing the desired applications.

On the other hand, a well known management field is Service oriented Provisioning, which requires the network operator to engineer the way in that services are created and distributed into a network, so that a telecom service provider can define his service offering as a specific set of services. US 2002/0178252 discloses some example of mechanisms for Service Provisioning. However, implementing Service Provisioning is focused on the final user (in one end of the network) and does not consider network topology configuration at all. US 2002/0178252 describes a procedural processing of the service configuration based on workflows and does not consider declarative descriptions of configuration.

In contrast to Service Provisioning, the whole network and not just the user end must be taken into account in network topology configuration (as a matter of fact, in some management contexts, such as experimentation infrastructures or testbeds, there is no a final user). Network topology configuration deals with how to define, and configure arbitrary interconnections among network elements, and so declarative descriptions of the network configuration are required. Declarative descriptions can be used from a high-level user perspective to describe the configuration wanted by the user, without specification of the means needed to get that configuration (this specification of the means used by the management engine is needed for the service provisioning mechanism disclosed in US 2002/0178252 in the form of workflow definitions).

SUMMARY OF THE INVENTION

One aspect of the present invention is a method for logical deployment of global target network configurations based on a data model defining the intended global network configuration. In this context, "logical" means that the goal is the deployment of a target network on top of an exiting background network, already physically deployed, taking advantage of IP technology to build overlay networks. Besides, this invention provides complementary methods for logical undeployment and monitoring of the target IP network in a global way.

The logical deployment of global network configurations according to the proposed method is based on a text-based information structured language data model, which describes the intended network configuration globally; distinguishing the present invention from others like the one described in US 2004/0117452 A1. The text-based information structured language may be the standardized XML, so the utilization of this invention by third-party applications can be flattered. Other possible text-based information structured languages to write the data model may be SGML or ASN.1.

Therefore, it is an object of the invention to provide an intuitive and user-friendly mechanism for automatically configuring and reconfiguring multiple IP network topologies, involving configuration issues such as number of nodes and link connectivity, as well as remotely configuring the execution of processes at each node (e.g., routing or signalling processes).

Note that for establishment and reconfiguration of a desired network topology, given the usual large size of networks (composed of several devices with different pieces of hardware, each one with its own configuration requirements), manual topology reconfiguration results in elevated time consuming and error prone complex tasks. Usually, these tasks become more critical if the network administrator has to fulfil them "by hand" using command line interfaces (CLI).

In order to solve and speed up those tedious operations, another object of the invention is to allow network administrators performing a high-level specification of a target network configuration in a flexible manner, avoiding spending administration time in carrying out manual configuration node by node.

The administrator or user may apply user-friendly XML existing tools to get the specification of a target IP network. Though, he/she is not required to produce directly a set of XML files, since the present invention may be integrated in a graphical user interface (GUI) just to draw the IP network scenario and logical deploy/undeploy the target network on a background IP network, including configuration and reconfiguration of the processes to be run at each node of the target IP network.

In addition to the aforementioned tasks, the present invention allows monitoring the status of the already logically deployed and working network, being able to alert the administrator when any element involved in the IP network (a node, process in a node, or an interface between nodes) fails or goes wrong.

More concretely, the first aspect of the invention refers to a method for logical deployment of a target IP network on a background IP network. The target IP network comprises at least one network element ($NE_N$; $N \geq 1$) and is supported on the background IP network formed by the at least one network element ($NE_N$) and at least one network elements controller ($NEC_Q$; $Q \geq 1$). The background IP network provides IP functional interfaces ($C_{ik}$) between the at least one network elements controller ($NEC_k$; k in the 1 ... Q range) and each network element ($NE_i$; i=1 ... N). This method for logical deployment of a target IP network comprises the steps of:

1st step). Retrieving at the at least one network elements controller ($NEC_k$) at least one process information fragment written in the text-based information structured language (e.g. XML) for at least one of said network elements ($NE_i$), said at least one process information fragment defining the configuration of a network-related process.

2nd step) Creating, at said at least one network elements controller ($NEC_k$), a command script for each network element ($NE_i$), being the command script a list of operations in terms of the functional interface ($C_{ik}$) and the operations which are to be executed in that particular network element using the respective functional interface ($C_{ik}$) by the corresponding network elements controller ($NEC_k$). At this step the content of the command script may be void.

3rd step) Generating or deriving from said process information fragment at least one configuration template, for the configuration of at least one network-related process and for at least one of the network elements.

4th step) Adding at least a command to the command script corresponding to said at least one network element, for starting each of said at least one network-related process using said configuration template.

5th step) Pushing each of the configuration templates from the network elements controller ($NEC_k$) to the respective network element ($NE_i$); pushing means sending the configuration templates from the network elements controller ($NEC_k$) through the corresponding functional interfaces ($C_{ik}$) and storing said configuration templates at said corresponding network element $NE_i$).

6th step) Executing the command script for said network element ($NE_i$) in a remote mode through the respective functional interface ($C_{ik}$) (i=1, ..., j, ..., N), which consists of any IP-based protocol allowing the remote executions of commands, either one-by-one or in a batch mode.

The IP functional interfaces ($C_{ik}$) between a network element ($NE_i$) and the respective network elements controller ($NEC_k$) may be one of the standard protocols: RLOGIN, TELNET, SSH, TL1, RPC, RMI, XML-RPC, HTTP, SOAP, CORBA, COM+ and SNMP.

Regarding configuration templates, they are defined as pieces of information that need to be pushed (sent and stored) to network elements, so that their network-related processes can work properly when they are started (for example, configuration templates contain parameters to be read by a network-related processes when started).

Optionally, the method for logical deployment of the target IP network may include in the mentioned fourth step of adding commands to command scripts at said at least one network elements controller ($NEC_k$) further adding a command for setting an IP interface ($D_{ij}$; obviously, here i≠j, i=1 ... N, j=1, ... N) between two network elements ($NE_i$, $NE_j$). These commands for setting an IP interface ($D_{ij}$) are added to each of the two command scripts corresponding to said two network elements ($NE_i$, $NE_j$) and before the commands used for starting the network-related processes (as specified in step 4). In such a case, at step 6 of this method for logical deployment, it is clear that said commands are executed remotely, as part of the two corresponding scripts, through the respective functional interface ($C_{ik}$, $C_{jk}$) of the network elements controller ($NEC_k$) with network element ($NE_i$) at its first end and network element ($NE_j$) at its second end respectively.

The so-called network-related processes, to be started at the network elements ($NE_N$) may be selected from a group of: routing daemons, servers, service platforms, hardware controllers, management agents, reservation protocol daemons and link resource management deamons. Some of these network-related processes needs to use the corresponding IP interface ($D_{ij}$) for their operation. There can be also network-related processes started at a network element ($NE_i$) that operate without involving any previous set of an IP interface ($D_{ij}$) with another network element ($NE_j$).

In this context, a "daemon" is a process continuously running in background performing a particular, task, A "server"

is a particular kind of daemon that listens for request from network clients, process them and send a response back to the client, implementing a particular service.

Thus, the described method allows the configuration of all needed IP interfaces ($D_{ij}$) between pairs of network elements ($NE_i$, $NE_j$), and their specification is defined as part of the target IP network. The particular information defining the IP interfaces ($D_{ij}$) depends on the particular IP connection type (direct or tunnelled), the IP networking protocol version (IPv6, IPV4), on the layer 2 or link layer aspects (Ethernet switching for Virtual Local Area Networks—VLANs—, virtual circuit technologies, etc.).

Furthermore, after having a target IP network deployed according to the steps for logical deploying as described before or by another conventional method for network configuration, another aspect of the invention refers to providing in a similar intuitive way a method for logical undeployment of a target IP network comprising at least one network elements ($NE_1, \ldots, NE_i, \ldots, NE_j, \ldots, NE_N$) belonging to the previously deployed target IP network.

This method for logical undeploying comprises the following steps:

$1^{st}$ step) Retrieving at the at least one network elements controller ($NEC_k$) at least one process information fragment written in a text-based information structured language, for at least one of the network elements ($NE_i$), said at least one process information fragment defining a, network-related process;

$2^{nd}$ step) Creating a command script for each of said network elements ($NE_i$) at one (or more if necessary) corresponding network elements controller ($NEC_k$), $3^{th}$ step) Adding at least a command to the command script generated at the corresponding network elements controller ($NEC_k$), being said commands defined for stopping each of the at least one network-related process started for at least one network element ($NE_i$); and $4^{th}$ step) Remotely executing through the respective functional interface ($C_{ik}$) the command script for the at least one network element ($NE_i$), (i=1, ..., j, ..., N).

If an at least one IP interface ($D_{ij}$) has been specified between a pair of network elements ($NE_i$, $NE_j$) in the logical deployment of the target IP network, the step of adding commands to command script at said at least one network elements controller ($NEC_k$) further comprising:

adding a command for unsetting the IP interface ($D_{ij}$) between the network elements ($NE_i$, $NE_j$) to each of the two respective command scripts and said commands are added to the command script after the ones used for stopping the network-related process (as specified in step 3).

Another capability of this invention is a global monitoring of the target IP network. Hence, a method for logical monitoring of a target IP network is proposed here and allows a network administrator checking the status of the network-related processes for the network elements from said target IP network, which has been previously deployed by either the already described method for logical deployment or another conventional method for network configuration. The method for logical monitoring comprises the following steps, after steps of retrieving the needed process information fragments and creating new command scripts at the corresponding network elements controller ($NEC_k$) for each network element ($NE_i$) as explained before:

adding at least a command to the command script generated at the corresponding network elements controller ($NEC_k$) for checking the status (active or inactive, running, killed, ...) of each of the at least one network-related process started for at least one network element ($NE_i$); and remotely executing through the respective functional interface ($C_{ik}$) the command script for the at least one network element ($NE_i$), (i=1, ..., j, ..., N).

Additionally, the method for logical monitoring allows an administrator, if at least one IP interface ($D_{ij}$) is previously set and needed, monitoring the IP interface ($D_{ij}$) between any two network elements ($NE_i$, $NE_j$). In order to check this IP interface ($D_{ij}$), ping is performed to test Whether the particular pair of network elements ($NE_i$, $NE_j$) at each end of said IP interface ($D_{ij}$) is reachable across the IP network. Thus, this method comprises the step of:

at said at least one network elements controller ($NEC_k$), adding at least a ping command for the IP interface ($D_{ij}$) to each of the two command scripts corresponding to the two interface ending network elements ($NE_i$, $NE_j$).

The ping commands are added to each command script preferably before the commands used for checking the status of the network-related processes. The step for pinging further comprises sending Echo messages according to the standardized Internet Control Message Protocol (ICMP), which is one of the core protocols of the Internet protocol suite chiefly used by networked computers' operating systems to send error messages-indicating, for instance, that a requested service is not available or that a network element could not be reached. In particular, the method for monitoring performs the following message exchanges in the pinging step:

sending an ICMP Echo Request message to first end of said interface ($D_{ij}$) at one of the network elements ($NE_i$) and listening for ICMP Echo Response message replied from said network element ($NE_i$) for a determined or pre-selected time, said ICMP Echo Request sent from the other network element ($NE_j$); and, if an ICMP Echo Response message is received from said network element ($NE_i$) within said determined time:

sending an ICMP Echo Request message to second end of said interface ($D_{ij}$) at the other network element ($NE_j$) and listening for ICMP Echo Response message replied from said network element ($NE_j$) for a determined time (usually applying the same time constraints for both network elements), said ICMP Echo Request sent from the first end of said interface ($D_{ij}$) at corresponding network element ($NE_i$).

There are other aspects of the present invention which refer to providing respective methods for logical deployment, undeployment and monitoring of a target IP network on a background IP network just to implement the setting, unsetting or monitoring respectively of a IP interfaces ($D_{ij}$), (i≠j). Obviously, these IP interfaces ($D_{ij}$) can be used by network-related processes that can be either configured at a pair of network elements ($NE_i$, $NE_j$) of the target IP network according to the method for logical deployment described firstly or by employing another conventional method for network configuration which is suitable for managing network-related processes over the background IP network.

Thus, it is provided a method for logical deployment of a target IP network on a background IP network which comprises the steps of:

$1^{st}$ step) Retrieving at the at least one network elements controller ($NEC_k$) a IP networking information fragment written in a text-based information structured language for at least a pair of network elements ($NE_i$, $NE_j$), said IP networking information fragment defining a IP networking layer (INL). The IP networking layer, also known as network layer and sometimes called the Internet layer, handles the movement of packets around the network ["TCP/IP Illustrated, Volume 1: The Protocols", by W. Richard Stevens, Addison-Wesley, Chapter 1.2, page 2, 1994]. This layer and, more particularly, the IP networking information fragment comprises the specification of:

interfaces provided by each network element ($NE_i$) and connection to the other network elements ($NE_j$) through said interfaces: here called IP interfaces ($D_{ij}$), IP address (and mask) for each one of said interfaces ($D_{ij}$).

$2^{nd}$ step) Creating, at said at least one network elements controller ($NEC_k$), a command script for each of said network elements ($NE_i$, $NE_j$).

$3^{th}$ step) Adding at least a command for setting an IP interface ($D_{ij}$) between said two network elements ($NE_i$, $NE_j$) to each of the command scripts corresponding to the pair of network elements ($NE_i$, $NE_j$), using said IP networking information fragment, at said at least one network elements controller ($NEC_k$).

Correspondingly, a method for logical undeployment of a target IP network is here described, said target IP network already deployed by the very previous method for logical deployment or another conventional method for IP interfaces configuration, in which at least an IP interface ($D_{ij}$) between two network elements ($NE_i$, $NE_j$) has been set. This method for logical undeployment comprises steps for retrieving the IP networking information fragment at the corresponding network elements controller ($NEC_k$) and creating, at said at least one network elements controller ($NEC_k$), new command scripts for each of said network elements ($NE_i$, $NE_j$), and then perform the step of:

adding to each of the command scripts corresponding to the pair of network elements ($NE_i$, $NE_j$) at least a command for unsetting the IP interface ($D_{ij}$).

And the invention also provides with a method for logical monitoring of a target IP network already deployed in which at least an IP interface ($D_{ij}$) between two network elements ($NE_i$, $NE_j$) has been previously set according to the three steps explained before for the previous method for logical monitoring or according to another conventional method for IP interfaces configuration, which allows to know whether the IP interface ($D_{ij}$) is enabled or, on the contrary, any failure occurs on reaching any of the two network elements ($NE_i$, $NE_j$) across said IP interface ($D_{ij}$). In order to get such proposal, this method for logical monitoring comprising steps for retrieving the IP networking information fragment at the corresponding network elements controller ($NEC_k$) and creating, at said at least one network elements controller ($NEC_k$), new command scripts for each of said network elements ($NE_i$, $NE_j$), and then perform the step of:

adding to each of the command scripts created for the pair of network elements ($NE_i$, $NE_j$) at least a command for pinging the IP interface ($D_{ij}$) between the two network elements ($NE_i$, $NE_j$)—as explained before for the pinging step—.

It is another aspect of the present invention to provide a computer, program comprising computer program code means adapted to perform the steps of (any or even all of) the described methods, when said program is run on a central processing unit or processor of a computer, a general purpose processor, on a digital signal processor, a field-programmable gate array, an application-specific integrated circuit, a microprocessor, a micro-controller, or any other form of programmable hardware.

It is further another aspect of the present invention to provide a network node comprising IP networking means for communication to at least another node and processing means adapted to perform the steps of any of the methods proposed. Such network node, at which any or even all of the described methods for logical deploy/undeploy/monitoring can be implemented, is what is denominated here like network elements controller (NEC), provided with means for communication with another nodes so-called network elements (NE). These network elements and network, elements controllers are nodes from an IP network, here the so-called background IP network.

And it is another aspect of the present invention to provide a telecommunications network comprising at least one of these nodes acting as network elements controllers (NEC).

The main advantages and innovations of the proposed invention become apparent in the description and are summarized as follows:

1. Multiple (per managed device) remote access interfaces vs. fixed explicit communication protocols: The invention described in this document neither defines a particular communication protocol, nor imposes any restriction in the communication interface of the configured elements, as a conventional management system does (like SNMP or HTTP). Instead, the present invention reuses as communication protocol any existing remote access interface the managed device is providing (like Telnet, SSH or TL1), here called as IP functional interface ($C_{ik}$). In fact, multiple remote access types can be used seamlessly, since each network element ($NE_i$) (managed device) can provide a different IP functional interface ($C_{ik}$) with the corresponding network elements controller ($NEC_k$) in the same background IP network.

2. There are no explicit agents: As explain for invention background, in the current state of the art, conventional management systems need running a dedicated process in the managed device in order to deal with the communication protocol queries from the manager and providing an interface to the device internal data and parameters. This implies complexity (different agents need to be developed, for different devices) and inefficiency (the agent process consumes resources in the managed device). On the contrary, the present invention does not use explicit agent processes, allowing the manager direct access to data and parameters through the remote access or IP functional interfaces.

3. High-level actions and module-oriented in the global network vs. low-level actions and object-oriented in individual network elements: Conventional management systems are based on atomic actions ("get", "set", etc.) applied to elemental data objects (for example, the IP address of the managed device) in individual network elements. Therefore, a user-oriented manager has to integrate many atomic actions to perform high-level management tasks in order to provide global network configurations and the development of such manager could be complex. The present approach is easier and more intuitive because it is based on high-level actions (deploy, undeploy and monitor) and software modules (i.e., a process) instead of low-level actions and atomic object orientation subjects.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DETAILED DESCRIPTION OF THE INVENTION

Here below a practical implementation of the invention is described, which is based on the general network architecture shown in FIG. 1. This general network architecture gathers:
several network elements ($NE_1, \ldots, NE_i, \ldots, NE_j, \ldots, NE_N$) connected to an IP Network (10) through a plurality of interfaces ($A_1, \ldots, Ai, \ldots, A_j, \ldots, A_N$), and
several Network Elements Controllers ($NEC_1, \ldots, NEC_k, \ldots, NEC_Q$) connected to the same IP Network (10) through another plurality of interfaces ($B_1, \ldots, B_k, \ldots, B_Q$).

These interfaces ($A_1, \ldots, A_N, B_1, \ldots, B_Q$) on the IP Network (10) with the network elements ($NE_1, \ldots, NE_i, \ldots, NE_j, \ldots, NE_N$) and Network Elements. Controllers ($NEC_1, \ldots, NEC_k, \ldots, NEC_Q$) respectively could be all of the same type, for example, Ethernet interfaces.

This IP Network (10) also provides a plurality of IP functional interfaces ($C_{ik}$) from each network element ($NE_i$) to the at least one network elements controller ($NEC_k$). The configuration of these functional interfaces is not provided by the invention, they are supposed pre-configured, previously to the application of the method described in this document.

Figure 1:
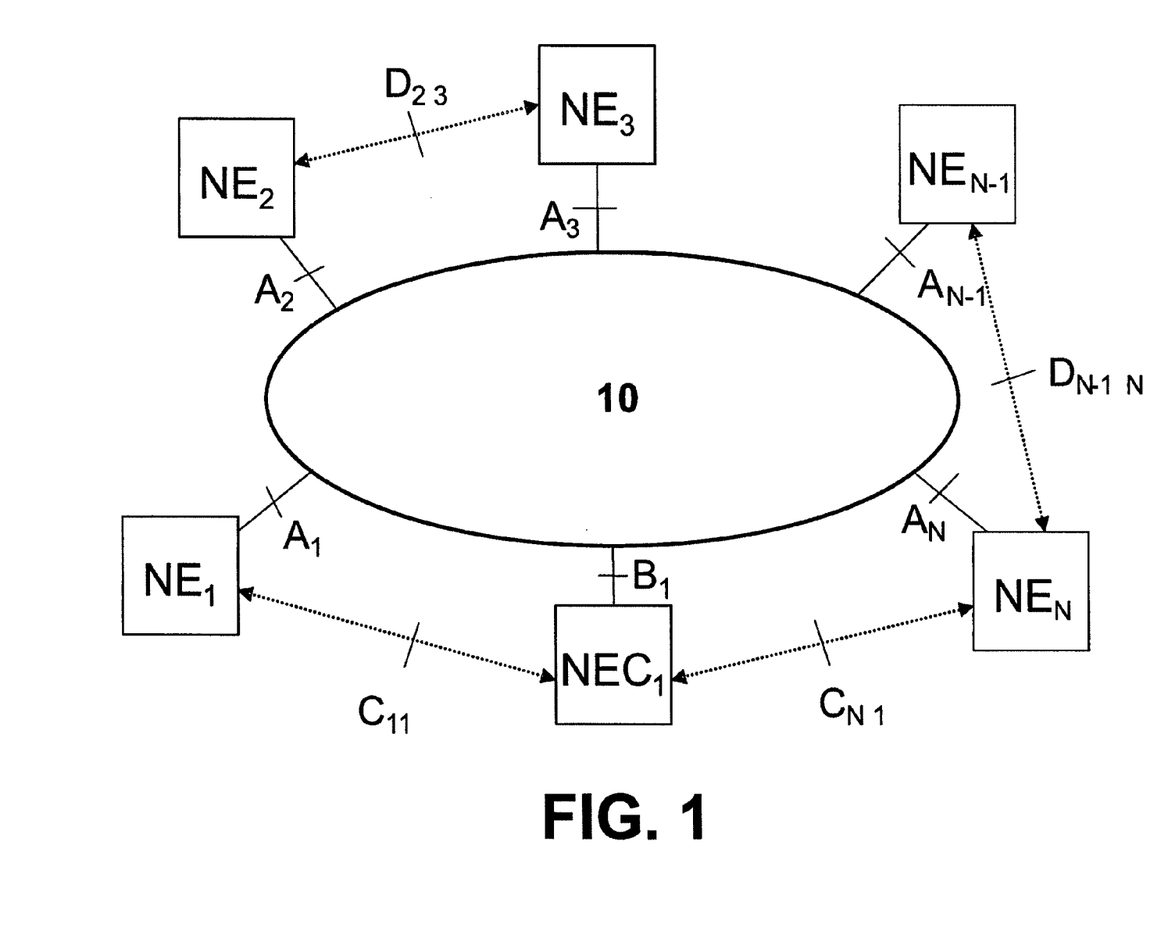
FIG. 1 is a schematic representation of a target IP network comprising a plurality of network elements ($NE_1$, . . . , $NE_i$, . . . , $NE_j$, . . . , $NE_N$) supported on a background IP network composed of these gathered network elements and at least one network elements controller ($NEC_1$), in accordance with an embodiment of the present invention.

FIG. 1 only shows one Network Elements Controller ($NEC_1$) for the sake of clarity, but in a general, case there would be as many as desired ($NEC_k$), each one with its own $C_{1k}, \ldots, C_{Nk}$, interfaces.

The IP Network (10) constitutes an existing background IP network over which is defined a target IP network by the multiple network elements $NE_1, \ldots, NE_i, \ldots, NE_j, \ldots, NE_N$ to be managed.

Figure 2:
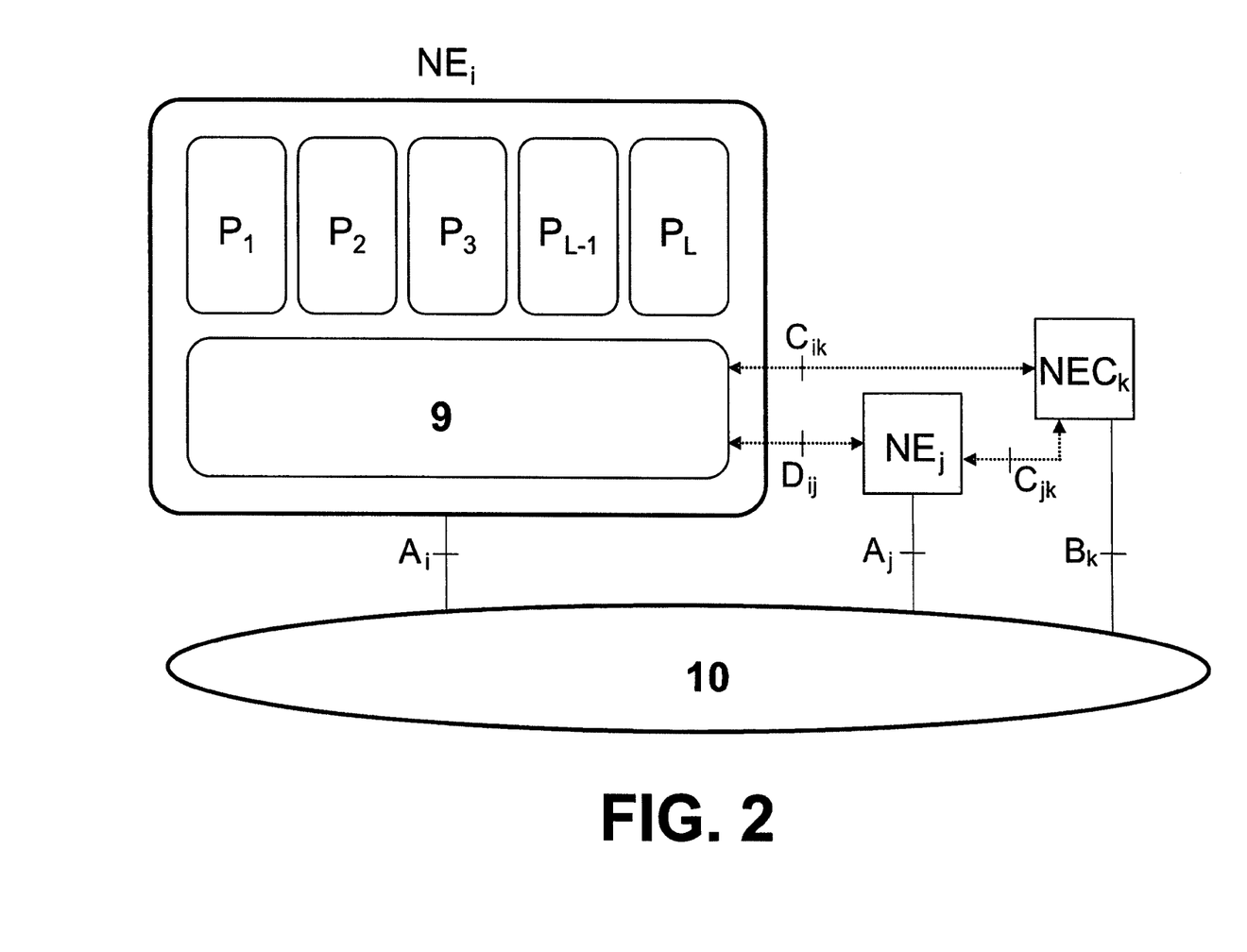
FIG. 2 is a detail of the architecture of one network element ($NE_i$), showing the interfaces with other network elements ($NE_j$) and other network elements controller ($NEC_k$).

Each network element ($NE_i$) has a modular architecture, as depicted in FIG. 2, that implements an IP networking layer (9) and runs/executes several (L, with $L \geq 0$) network-related processes ($P_1, \ldots, P_L$). The IP networking layer (9) can be configured to provide IP interfaces ($D_{ij}$) from any of the network element ($NE_i$) to another one ($NE_j$), being i and j any non equal integers in the $1, \ldots, N$ range. The configuration of these IP interfaces ($D_{ij}$) is provided by the method described in this document.

Note that actual implementations of this invention may not implemental the possible interfaces specified in the general description. For example, in a practical implementation with four network elements maybe only four IP interfaces (for example: $D_{12}, D_{23}, D_{34},$ and $D_{14}$) could be considered, instead of all the resting possible ones: $D_{13}, D_{14}, D_{21}, D_{23}, D_{24}$ and $D_{34}$.

An example of application could be configuration of a dynamically switched optical transport network, where the network elements are:
Optical Connection Controllers (OCC) implemented in computers and constituting the control part of physical optical nodes,
A Link Emulator device
Ethernet Switches
A router-broadband-tester with vendor-specific technology In that example, the IP functional interfaces ($C_{ik}$) are based either in SSH—for the OCCs and link emulator—, Telnet—for the switches—or RPC—provided by vendor for the router tester device—. There are three kinds of IP interfaces ($D_{ij}$): OCC-OCC directly connected through real optical fibber, OCC-OCC not using network constraints—through a dedicated VLAN—, OCC-OCC using network constraints—through link emulator device—and OCC-broadband tester—through a dedicated VLAN—. Each Optical Connection Controller runs five network-related processes (then, L=5 in this example): Optical Link Resource Manager (OLRM), Link Resource Manager (LRM), the Open Shortest Path First (OSPF) routing protocol, the Resource Reservation (RSVP) signalling protocol and SNMP management protocol. The broadband tester runs a RSVP process.

Figure 3:
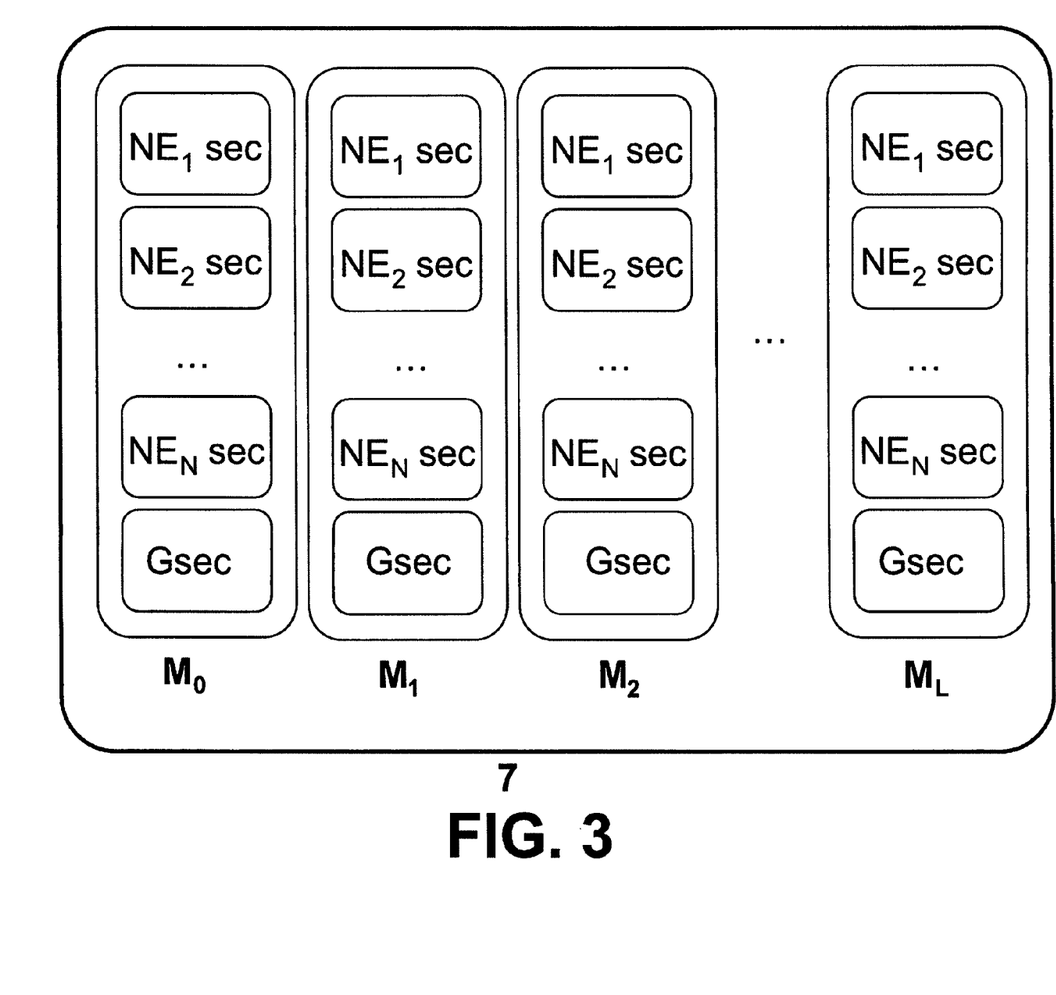
FIG. 3 is a schematic representation of a target network configuration structure formed by XML modules from a data model, in accordance with a preferred embodiment of the present invention.

Using a text-based information structured language such as XML, a global network configuration can be specified, defining a plurality of information Modules ($M_0, M_1, \ldots, M_L$) that determines a target network configuration structure (7), drawn in FIG. 3. There are process information modules ($M_1, \ldots, M_L$) describing each one of the L network-related processes ($P_1, \ldots, P_L$) along as one more information module specifying the IP networking configuration needed in the target network configuration structure (7) and here called IP networking information module ($M_0$). The present invention provides an user/administrator with means for logical deployment, of this global network configuration into the corresponding network elements ($NE_1, \ldots, NE_i, \ldots, NE_j, \ldots, NE_N$) using the pre-configured IP functional interfaces ($C_{ik}$) with at least one of the network elements controller ($NEC_1, \ldots, NEC_k, \ldots, NEC_Q$.

Each information module ($M_0, M_1, \ldots, M_L$) is composed of N+1 sections: there are N sections ($NE_1 sec, \ldots NE_i sec, \ldots, NE_N sec$), corresponding to each one of the network elements ($NE_1, \ldots, NE_i, \ldots, NE_j, \ldots, NE_N$) and a global section (Gsec) including configurations elements involving several network elements ($NE_1, \ldots, NE_i, \ldots, NE_j, \ldots, NE_N$). Empty sections are allowed, but each module ($M_0, M_1, \ldots, M_L$) must include at least one section.

A particular set of IP networking information module ($M_0$) plus process information modules ($M_1, \ldots, M_L$) realization consists of, for example, a set of L+1 XML files stored in the hard disk of any of the network elements controller ($NEC_1, \ldots, NEC_k, \ldots, NEC_Q$). Another implementation alternative is a group of records in a XML-based distributed database.

The possible embodiments of the target network configuration structure (7) define a XML-based data model. Building, storing and retrieving of target network configurations from the XML-based data model is out of the scope of this patent. Network administrators can use any suitable XML tool or database interface, for example, a graphic user interface program or a database manager program for these purposes.

The retrieved XML-based data model structured in the L+1 information modules ($M_0, M_1, \ldots, M_L$) specifies the global network configurations to be deployed. The user/administrator can retrieve the needed process information fragments from the process information modules ($M_1, \ldots, M_L$) describing each one of the L network-related processes ($P_1, \ldots, P_L$) for the set of network elements at which these processes ($P_1, \ldots, P_L$) are required to be configured for the target network configuration. Thus, a process information fragment is a set of sections from a process information module, so also written in XML or the text-based, information language used to specify the global network configuration. Likewise, in order to configure the IP interfaces ($D_{ij}$) to be provided by the IP networking layer (9), the user/administrator can retrieve the needed IP networking fragments consisting of a set of sections from the IP networking information module ($M_0$).

Each information module ($M_0, M_1, \ldots, M_L$) of the XML data model conforms to a Document Type Definition or XML Schema. The Document Type Definition (DTD) is a standard language developed primarily for the expression of a schema via a set of declarations that conform to a particular markup syntax. It describes a type of documents written in a text-based information structured language (SGML, XML) in terms of constraints on the structure of those documents. XML Schema is similar to DTD, accomplishing the same purpose. Hence, the DTD/XML Schema is a description of a type of XML documents, typically expressed in terms of constraints on the structure and content of documents of that type, above and beyond the basic syntax constraints imposed by XML itself. The DTD/XML Schema provides a view of the document type at a relatively high level of abstraction and is used for validation purposes during the workflow of the method for logical deployment, undeployment and monitoring described as follows and in accordance to FIG. 4.

More in detail, these information modules ($M_0, M_1, \ldots, M_L$) from the XML data model include:

The IP networking information module ($M_0$) with specifications of the IP networking layer (9) to support the IP interfaces ($D_{ij}$) comprises:

N sections ($NE_1sec, \ldots NE_isec, \ldots NE_Nsec$) including:
Reference to the network element ($NE_i$) index (i=1 to N).
The IP functional interface ($C_{ik}$) that each network elements controller ($NEC_1, \ldots, NEC_k, \ldots, NEC_Q$) uses to access the network element ($NE_i$). However, this is not the unique possibility and other implementations of the invention could not include the IP functional interface ($C_{ik}$) related information in the IP network information module ($M_0$). For instance, this information could be used implicitly by the software application implementing the very network elements controller ($NEC_k$) maybe, implemented in some configuration file or database of said network elements controller ($NEC_k$), which is out of the scope of this invention.

A global section (Gsec) must include:
The specification of all IP interfaces ($D_{ij}$) defined as part of the target IP network, depending upon the particular IP interface requirements (connection type, etc.).

The process information modules ($M_1, \ldots, M_L$) with specifications of the network-related processes ($P_1, \ldots, P_L$) comprises:

N sections ($NE_1sec, \ldots NE_isec, \ldots NE_Nsec$) including:
Reference to the network element ($NE_i$) index (i=1 to N).
The configuration for the process running in the NE. The particular information depends on the particular process.
All the necessary information regarding the process environment in network element ($NE_i$), for each, one of the network-related processes ($P_1, \ldots, P_L$); although if a particular process is not to be set in that network element ($NE_i$), it could be omitted. This information depends on the particular process type and the hardware platform of the network element—computer, host, router, etc.—but could include starting and stopping commands, pathname to the binary file implementing the process, location of configuration files, etc.

A global section (Gsec) pet network-related processes including:
Configuration elements that could affect as several process instances running in several network elements. It is up to the network administrator to use this section to include common configurations for several instances of the process in all network elements (for example, considering a dynamic routing process and supposing that all the instances uses the same routing algorithm configuration, such configuration could be defined in the global section).

Figure 4:
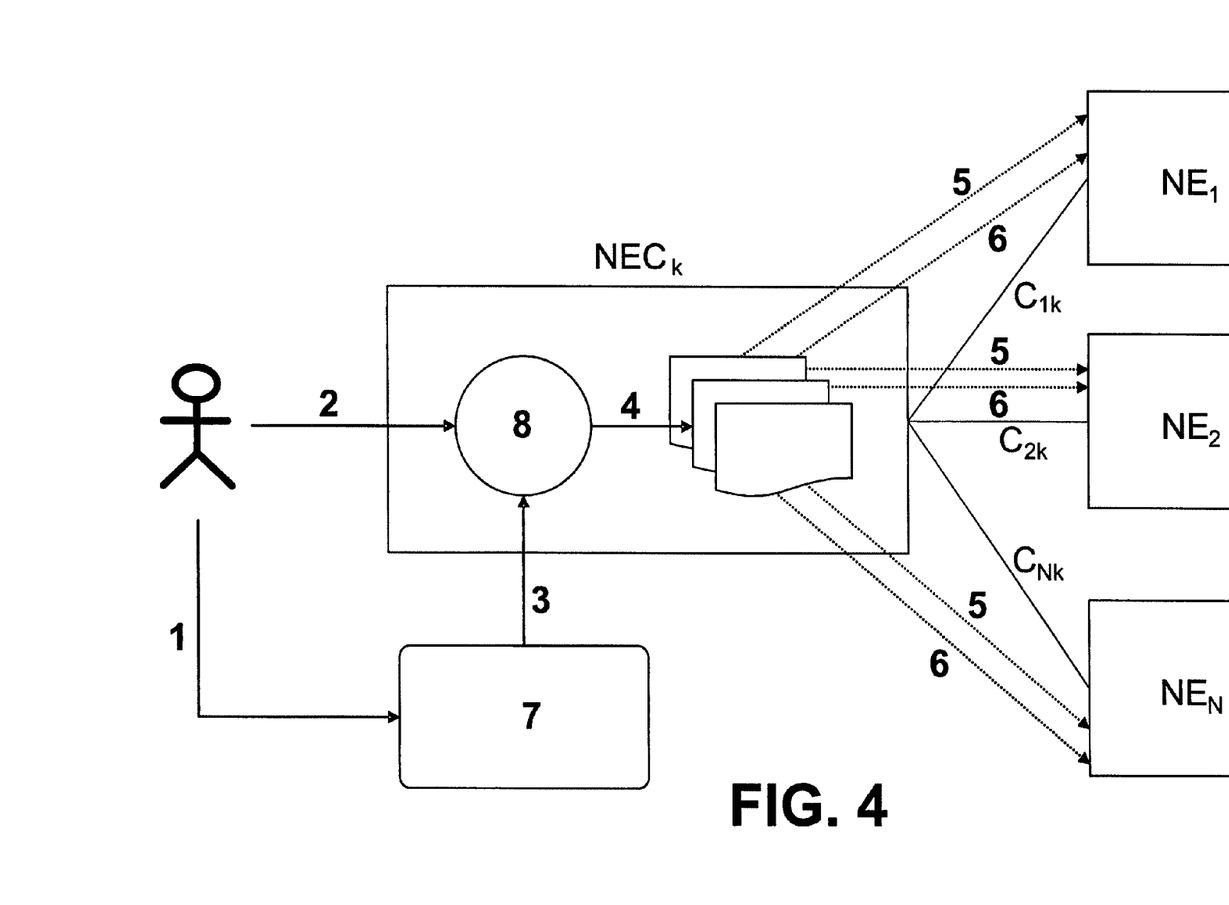
FIG. 4 shows a workflow of the invention, specifying the sequence of actions that need to be performed for deploying, monitoring or un-deploying of a particular global network configuration (for instance, the target IP network from FIG. 1).

Given a particular XML data model to be applied to a particular IP network architecture, the actions taken for logical deploying, undeploying and monitoring that particular IP network follow the workflow of FIG. 4:

(1) Previous to the application of the corresponding method, a target network configuration must be provided by the user by means of any suitable XML tool or database interface in order to do so and it will depend on how the target network configurations are built, stored and retrieved (out of the scope of this patent).

(2) User interacts with network elements controller (lets say $NEC_k$) in order to perform a particular action. There are three possible actions: DEPLOY, to establish the configuration in the network elements; UN-DEPLOY, to clear the configuration in the network elements, reverting the network to an un-configured state; and MONITOR, to check the status of IP interfaces ($D_{ij}$) and network-related processes in each network element ($NE_1, \ldots, NE_i, \ldots, NE_N$). In addition, the user specify the subset of the L+1 information modules: to which the action will be applied. The interface between users and network elements controller ($NEC_k$) is out of the scope of this patent.

(3) Upon command, an engine module (8) at network elements controller ($NEC_k$) retrieves the required target network configuration from the XML data model. The retrieval of the target network configuration data is out of the scope of this patent. If the engine module (8) is unable to retrieve all the needed modules of the target network configuration; it reports the error to user and the workflow ends.

(4) The engine module (8) processes the target network configuration, performing several actions in sequence:
a. Engine (8) validates the XML data modules against DTD/XML Schema. If validation is unsuccessful, it reports the error to user and the workflow ends.
b. If the validation is successful, the engine (8) generates command scripts in a per network element basis and configuration templates (in a per network element and network-related process basis). Command scripts are sequences of commands expressed in terms of the IP functional interface ($C_{ik}$) that will lead, upon execution in each network element, to the desired action (set up or deploy, set down or un-deploy, and monitor). Configuration templates are pieces of information that need to be pushed to network elements so that their network-related processes can work properly (for example, a configuration template could be a file that the process needs to read when it starts).

The target network configuration must contain all the needed information and parameters (maybe implicitly) in order to build the command scripts and configuration templates needed to implement the required action (deploy, un-deploy or monitor). Otherwise, this condition is reported to the user as error and the workflow ends.

(5) Configuration templates are pushed to each $NE_1, \ldots, NE_i, \ldots NE_N$ using the IP functional interface ($C_{ik}$) with the network elements controller ($NEC_k$).

(6) Command scripts are executed in each NE, in a remote mode using the IP functional interface ($C_{ik}$).

Finally, the user is reported on the result of the action. In the case of monitor action, this includes information about the status of the IP interfaces ($D_{ij}$) and network-related processes.

The engine (8) constitute an implementation at one network elements controller ($NEC_k$) of the three complementing methods for logical deployment, undeployment and monitoring of a target IP network, respectively performing configuration, reconfiguration or monitoring of network-related processes ($P_1, \ldots, P_L$) and also the IP interfaces ($D_{ij}$) that may be used by said network-related processes ($P_1, \ldots, P_L$).

Figure 5A:
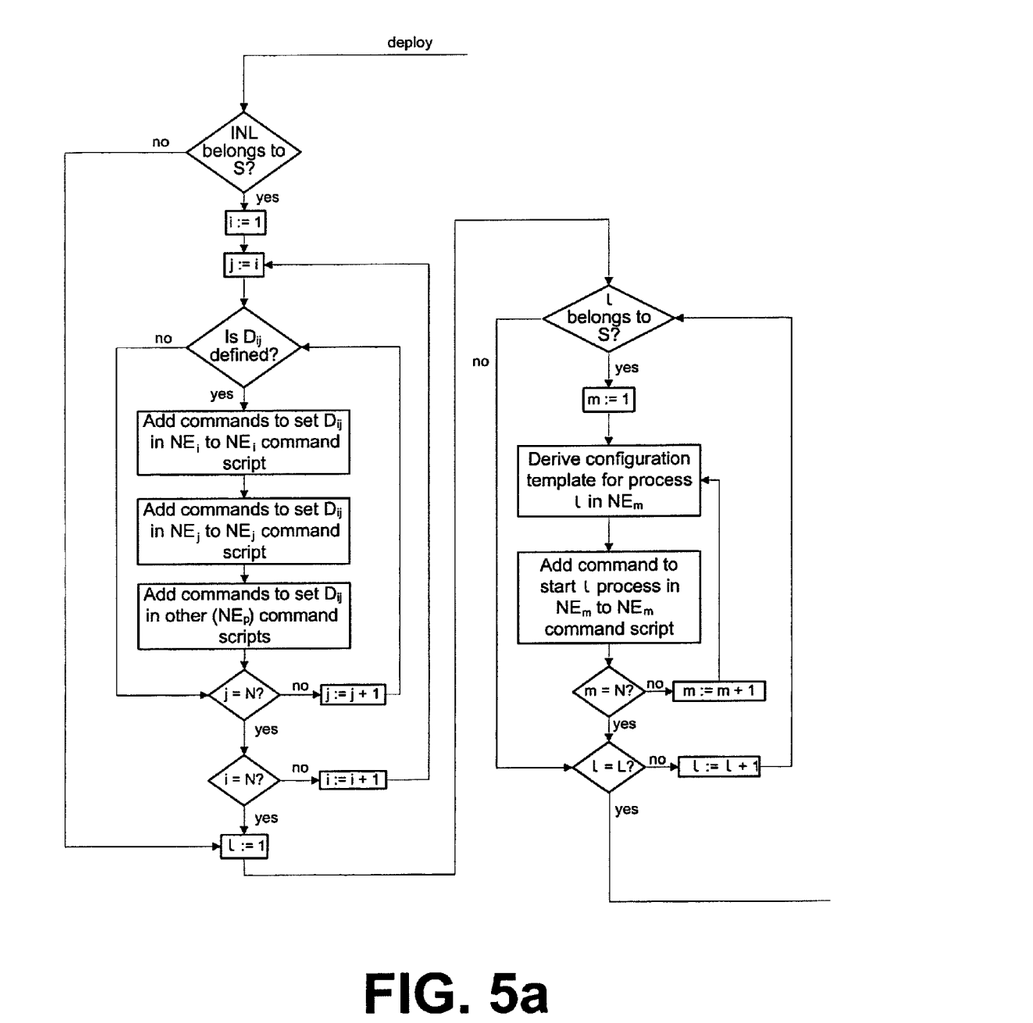
FIG. 5a-5d, put all together, represent a flowchart of a tool implemented at the network elements Controller ($NEC_k$) performing, in accordance with the preferred embodiment of the present invention, the steps for logical deployment (partially illustrated in FIG. 5a), undeployment (partially illustrated in FIG. 5b, where the common initial step of retrieving from the data module information fragments for deploy/undeploy or monitoring is drawn), and monitoring (partially illustrated in FIG. 5c), being the final common step of remotely execution of commands drawn in FIG. 5d.
Figure 5B:
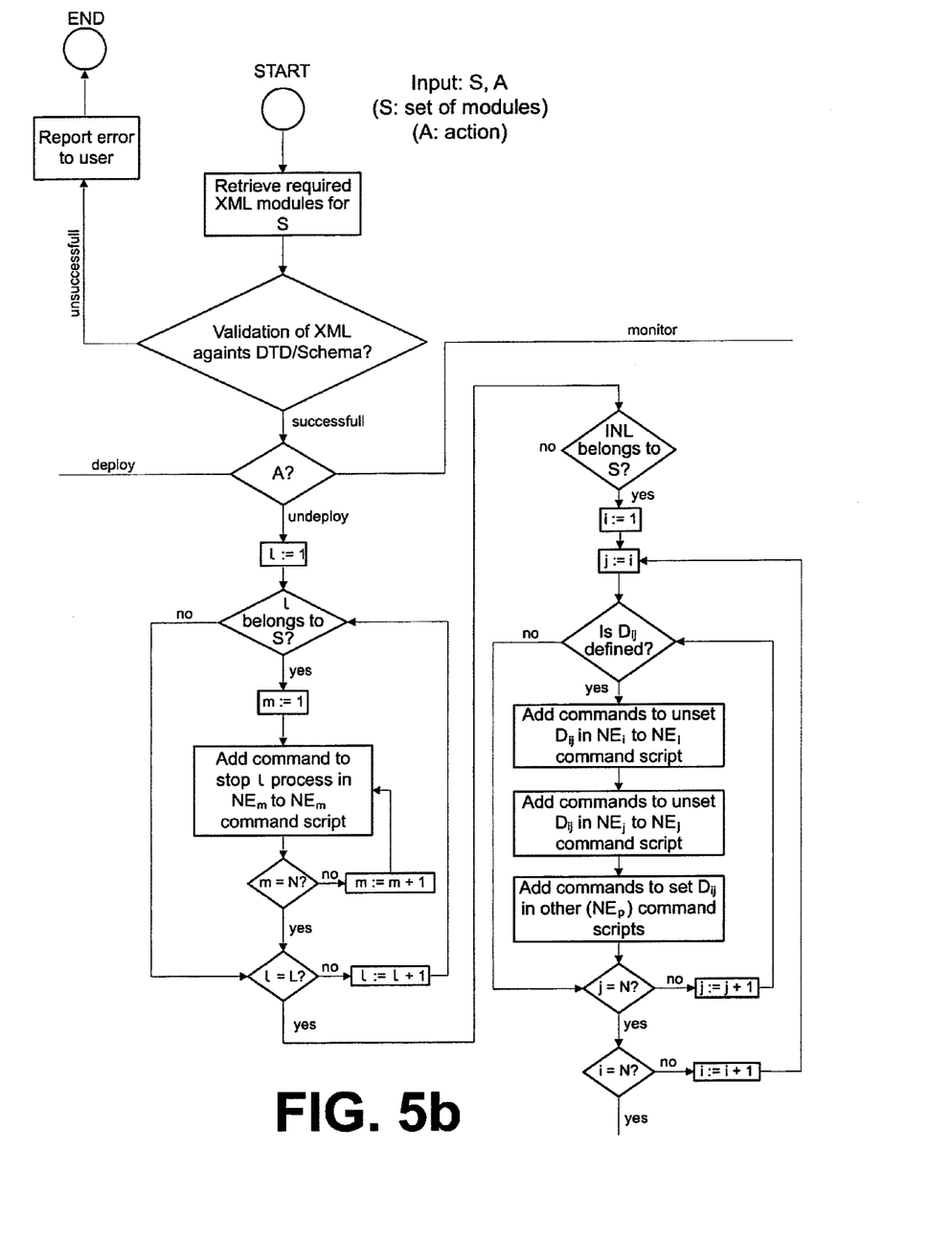
Figure 5C:
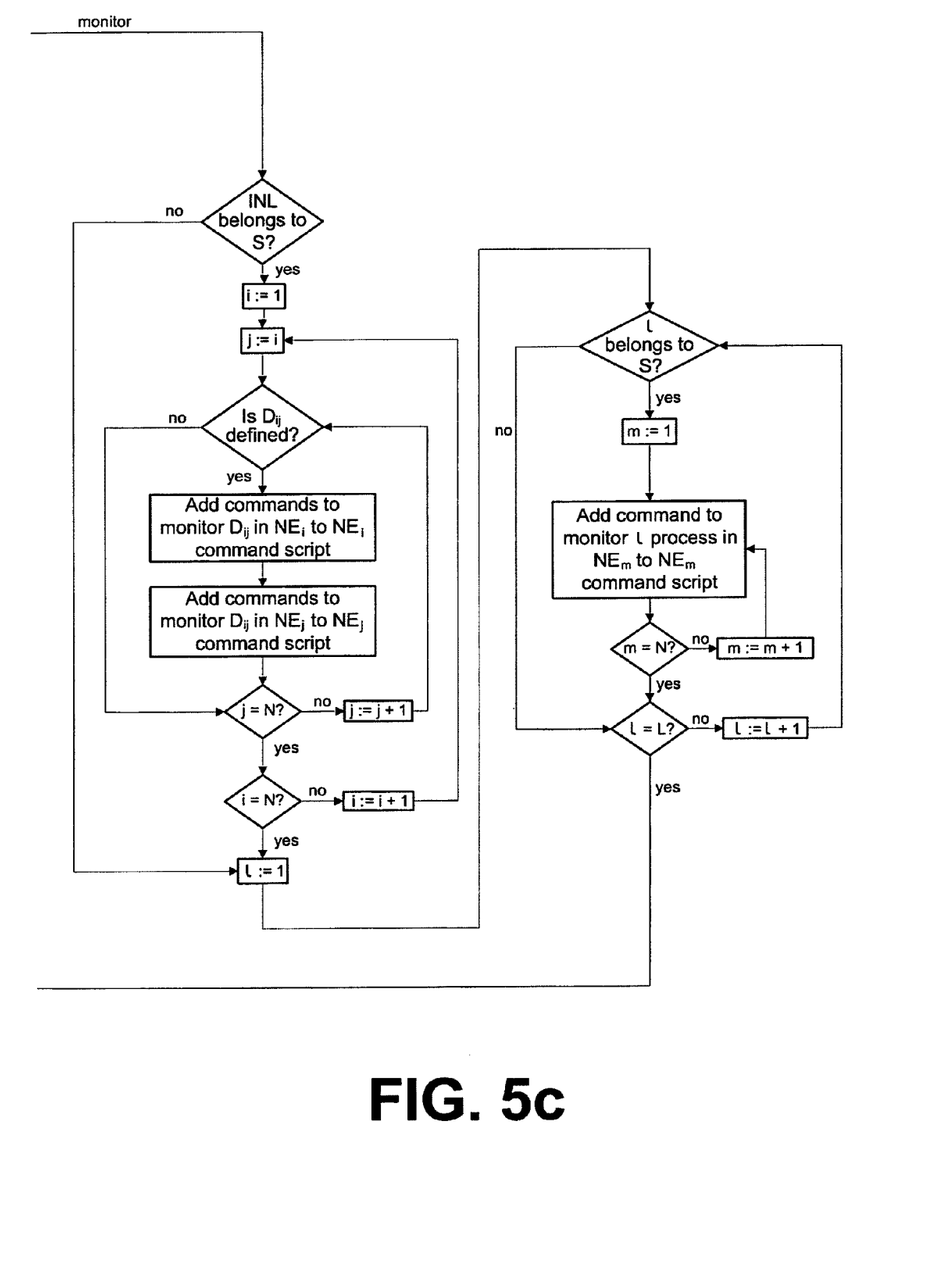

The steps executed in the engine (8) at a network elements controller ($NEC_k$) follow the flowchart split in three branches corresponding to actions of logical deployment, undeployment, and monitoring, depicted in FIGS. 5a, 5b and 5c respectively, altogether with a last branch that joins the previous three branches into the end of the flowchart.

The step of adding commands to the command script for setting an IP interface ($D_{ij}$) between two network elements ($NE_i$, $NE_j$) comprises:

allocating an IP address at first end of said interface, ($D_{ij}$) at one of the network elements ($NE_i$);

allocating an IP address at second end of said interface ($D_{ij}$) at the other network element ($NE_j$).

If said IP interface ($D_{ij}$) between the two network elements ($NE_i$, $NE_j$) is a VLAN switched Ethernet based interface, that step further comprises the operations of:

establishing a VLAN identifier at first end of said interface ($D_{ij}$) at one of the network elements (NED;

establishing a VLAN identifier at second end of said interface ($D_{ij}$) at the other network element ($NE_j$).

In case that the IP interface ($D_{ij}$) between two network elements ($NE_i$, $NE_j$) is implemented by means of an IP-based tunnel, such as GRE, IPSec or IP-over-IP, it is established a configuration of the two ends of said IP tunnel, said two ends corresponding to the two network elements ($NE_i$, $NE_j$).

In another possible case, when the target IP network is based on some virtual circuit techonology, like MPLS (Multiprotocol Label Switching), GMPLS (Generalized Multiprotocol Label Switching), ATM (Asynchronous Transfer Mode) or Frame Relay, there are more additional operations in said step in order to establish the virtual circuit or path (for example, in the case of MPLS, setting valour for label identifying the virtual circuit in the MPLS overlaid network).

If establishment of the IP interface ($D_{ij}$) needs configuration in at least some other intermediate network element ($NE_p$) different from $NE_i$ or $NE_j$ (lets said $NE_p$ with $p \neq i$ and $p \neq j$), said configuration is added to the command script of the at least said other intermediate network element ($NE_p$). This is the case when VLAN switches Ethernet based interfaces needing establish configuration in intermediate Ethernet switches or tunnel interfaces are used and so it is needed to configure all the network elements providing the tunnel.

In the step of adding commands to the command script for starting network-related processes, the command added consist merely in a shell command of the operating system if UNIX or compatible operating system is running in the NE.

Inversely, for logical undeployment, in the step of adding commands to the command script for stopping network-related processes, the command added can be the kill UNIX command, if UNIX or compatible operating system is running in the NE.

For logical undeployment, the step of adding commands to the command script for unsetting the IP interface ($D_{ij}$) between two network elements ($NE_i$, $NE_j$) further comprises:

removing the IP address allocated at first end of said interface ($D_{ij}$) at one network element ($NE_i$);

removing an IP address allocated at second end of said interface ($D_{ij}$) at the other network element ($NE_j$).

And depending on the kind of the IP interface ($D_{ij}$), this step for unsetting said IP interface ($D_{ij}$) correspondingly includes removing the configuration of the VLAN identifiers, the two ends of the IP-based tunnel or the virtual circuit established before and, in such a case that any other intermediate, network element ($NE_p$) different from $NE_i$ or $NE_j$ (lets said $NE_p$ with $p \neq i$ and $p \neq j$) is involved, removing the configuration of each intermediate network elements ($NE_p$) previously set to provide said IP interface ($D_{ij}$).

With regards to monitoring, the step for pinging the IP interface ($D_{ij}$) between two network elements ($NE_i$, $NE_j$) is based on ICMP echo messages, which are built at networking layer and then encapsulated as datagrams to be retransmitted. Hence, monitoring of IP interface ($D_{ij}$) is independent from the subjacent technology, since ping is based on IP address whose allocation is always required for setting the IP interface ($D_{ij}$), independently from its implementation—VLAN over Ethernet, GRE, IPSec or IP-over-IP, MPLS, GMPLS, ATM, Frame Relay, . . . —.

Besides, in order to monitor the network-related processes ($P_1, \ldots, P_L$) deployed at the corresponding network element ($NE_i$), in the step of adding at least a command to the command script for network element ($NE_i$), the command added consists merely in the pidof command in case that UNIX or compatible operating system is running in the $NE_i$. The pidof command is a UNIX utility that returns a process identifier (PID) of a running process, that is, monitoring network-related processes ($P_1, \ldots, P_L$) by regards to checking a particular network-related process belongs to the running process list being executed by the operating system kernel, at the network element ($NE_i$).

Figure 5D:
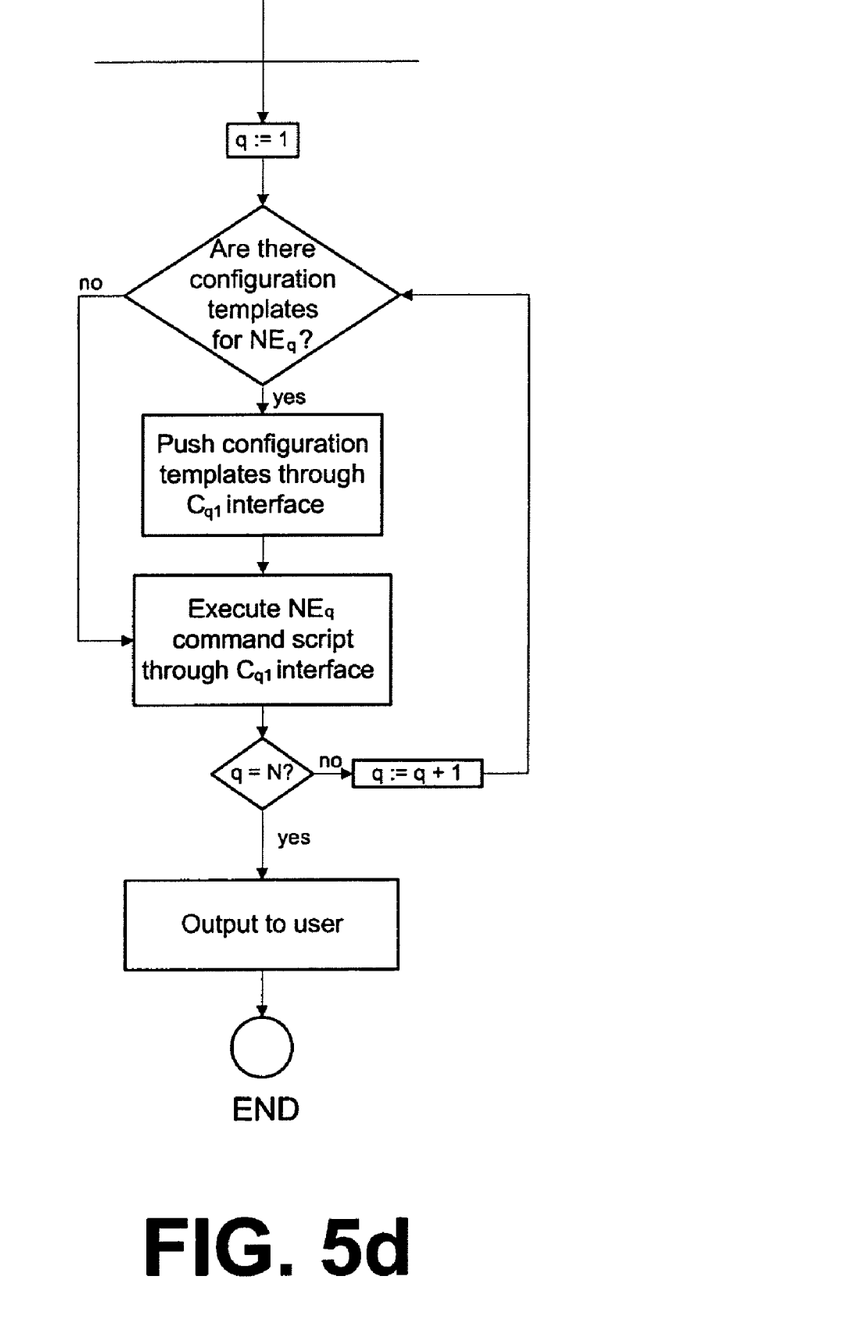

Remote execution of command scripts through the IP functional interface ($C_{ik}$) depends on the type of said preconfigured IP functional interface ($C_{ik}$). For instance, if the IP functional interface ($C_{ik}$) is based on RPC or Telnet, the commands added to the command script generated at the network element controller ($NEC_k$) are executed one by one in sequence at the corresponding, network element ($NE_i$). In case of SSH, a mixed mode is applied for remote execution of command scripts, which comprises copying firstly the script file to the network element ($NE_i$) and, next; a command sent by network element controller ($NEC_k$) is executed through the SSH interface in order to execute that script file—stored in the hard disk of said network element ($NE_i$) or any other storing media—. In this case, being IP functional interface ($C_{ik}$) implemented as SSH, the command script are just a list of shell commands.

The SSH interface can also be used to push configuration templates to the respective network element ($NE_i$) by copying firstly a file generated at the network element controller ($NEC_k$) with the configuration template derived from, the proper process information fragment $P_1, \ldots, P_L$) to the network element ($NE_i$), since SSH allows sending files from the network element controller ($NEC_k$) to said network element ($NE_i$).

In this text, the term "comprises" and its derivations (such as "comprising", etc.) should not be understood in an excluding sense, that is, these terms should not be interpreted as excluding the possibility that what is described and defined may include further elements, steps, etc.

The invention is obviously not limited to the specific embodiments described herein, but also encompasses any variations that may be considered by any person skilled in the art (for example, as regards the choice of components, configuration, etc.), within the general scope of the invention as defined in the appended claims.

Some preferred embodiments of the invention are described in the dependent claims which are included next.

The invention claimed is:

1. Method for logical deployment of a target IP network comprising a plurality of network elements ($NE_1, \ldots, NE_i, \ldots, NE_j, \ldots, NE_N$) capable of running network-related processes and supported on a background IP network which comprises said network elements ($NE_1, \ldots, NE_i, \ldots, NE_j, \ldots, NE_N$) and at least one network elements controller ($NEC_1, \ldots, NEC_k, \ldots, NEC_Q$), the background IP network providing IP functional interfaces ($C_{ik}$) between the at least one network elements controller ($NEC_k$) and each network element ($NE_i$), the method comprising the steps of:

retrieving at the at least one network elements controller ($NEC_k$) at least one process information fragment written in a text-based information structured language for each network element ($NE_i$), said at least one process information fragment defining one network-related process and being part of a target network configuration structure;

creating, by said at least one network elements controller ($NEC_k$), a command script for each network element ($NE_i$) based on the target network configuration structure and to be executed at the corresponding network element ($NE_i$);

generating, from said at least one process information fragment, at least one configuration template for at least one network-related process and for each network element ($NE_i$), to be used at the corresponding network element ($NE_i$);

adding at least a command for setting an IP interface ($D_{ij}$), based on the target network configuration structure, between two network elements ($NE_i, NE_j$) to each of the two command scripts corresponding to said two network elements ($NE_i, NE_j$);

adding to the command script for each network element ($NE_i$), after adding the commands for setting the IP interface ($D_{ij}$), at least a command for starting the at least one network-related process using the corresponding configuration template;

sending each configuration template from said at least one network elements controller ($NEC_k$) to the corresponding network element ($NE_i$) through the respective functional interfaces ($C_{ik}$) and storing said at least one configuration template at said corresponding network element ($NE_i$);

executing at the network element ($NE_i$) the command script for said network element ($NE_i$) in a remote mode, from the at least one network elements controller ($NEC_k$) and through the respective functional interface ($C_{ik}$).

2. Method according to claim 1, wherein the step of adding commands for setting an IP interface ($D_{ij}$) between two network elements ($NE_i, NE_j$) further comprises:

allocating an IP address at a first end of said interface ($D_{ij}$) at one network element ($NE_i$);

allocating an IP address at a second end of said interface ($D_{ij}$) at the other network element ($NE_j$).

3. Method according to claim 1, wherein said IP interface ($D_{ij}$) between two network elements ($NE_i, NE_j$) is a VLAN switched Ethernet based interface and the step of adding commands to said command script for setting an IP interface ($D_{ij}$) between two network elements ($NE_i, NE_j$) further comprises the steps of:

establishing a VLAN identifier at a first end of said interface ($D_{ij}$) at one network element ($NE_i$);

establishing a VLAN identifier at a second end of said interface ($D_{ij}$) at the other network element ($NE_j$).

4. Method according to either claim 1, wherein said interface ($D_{ij}$) between two network elements ($NE_i, NE_j$) is implemented by means of an IP-based tunnel and the step of adding commands to said command script for setting an IP interface ($D_{ij}$) between two network elements ($NE_i, NE_j$) further comprises the step of establishing a configuration of the two ends of said IP-based tunnel, said two ends corresponding to the two network elements ($NE_i, NE_j$).

5. Method according to claim 1, wherein said IP interface (Dij) between two network elements (NEi, NEj) is implemented by means of virtual circuit technology.

6. Method according to claim 1, wherein the step of executing the command script in a remote mode is performed in a one-by-one mode, for a remote execution of each command in sequence from said command script.

7. Method according to claim 1, wherein the step of executing the command script in a remote mode is performed in a batch mode for a remote execution of a plurality of commands simultaneously from said command script.

8. Method for logical undeployment of a target IP network comprising a plurality of network elements ($NE_1, \ldots, NE_i, \ldots, NE_j, \ldots, NE_N$) capable of running network-related processes and supported on a background IP network which comprises said network elements ($NE_1, \ldots, NE_i, \ldots, NE_j, \ldots, NE_N$) and at least one network elements controller ($NEC_1, \ldots, NEC_k, \ldots, NEC_Q$), the background IP network providing IP functional interfaces ($C_{ik}$) between the at least one network elements controller ($NEC_k$) and each network element ($NE_i$), and the target IP network having at least one network-related process been previously started for said at least one network element ($NE_i$);

the method comprising the steps of:

retrieving at the at least one network elements controller ($NEC_k$) at least one process information fragment written in a text-based information structured language for each network element ($NE_i$), said at least one process information fragment defining said at least one network-related process and being part of a target network configuration structure;

creating, by said at least one network elements controller ($NEC_k$), a command script for each network element ($NE_i$) based on the target network configuration structure and to be executed at the corresponding network element ($NE_i$);

adding to the command script generated at the previous step at least a command for stopping said at least one network-related process, using the corresponding process information fragment;

adding after the commands for stopping said network-related process, and if at least one IP interface ($D_{ij}$) between two network elements ($NE_i$, $NE_j$) of the target IP network has been previously set and an IP address has been allocated at each two ends of said interface ($D_{ij}$), at least a command for unsetting said IP interface ($D_{ij}$) to each of the two command scripts corresponding to said two network elements ($NE_i$, $NE_j$);

executing at the network element ($NE_i$) the command script for said network element ($NE_i$) in a remote mode, from the at least one network elements controller ($NEC_k$) and through the respective functional interface ($C_{ik}$).

9. Method according to claim 8, wherein the step of adding commands to said command script for unsetting the IP interface ($D_{ij}$) between two network elements ($NE_i$, $NE_j$) further comprises:

removing the IP address allocated at a first end of said interface ($D_{ij}$) at one network element ($NE_i$);

removing the IP address allocated at a second end of said interface ($D_{ij}$) at the other network element ($NE_j$).

10. Method according to claim 6, wherein, if the IP interface ($D_{ij}$) between said two network elements ($NE_i$, $NE_j$) is a VLAN switched Ethernet based interface and an VLAN identifier has been previously established at each end of said interface ($D_{ij}$), the step of adding commands to said command script for unsetting the IP interface ($D_{ij}$) further comprises the steps of:

removing the VLAN identifier established at a first end of said interface ($D_{ij}$) at one network element ($NE_i$);

removing the VLAN identifier established at a second end of said interface ($D_{ij}$) at the other network element ($NE_j$).

11. Method according to claim 6, wherein, if the IP interface ($D_{ij}$) between two network elements ($NE_i$, $NE_j$) is implemented by means of an IP-based tunnel and a configuration of each end of said interface ($D_{ij}$) has been previously established, the step of adding commands to said command script for unsetting the IP interface ($D_{ij}$) between two network elements ($NE_i$, $NE_j$) further comprises the step of removing the configuration of the two ends of the IP tunnel, said two ends corresponding to the two network elements ($NE_i$, $NE_j$).

12. Method for logical monitoring of a target IP network comprising a plurality of network elements ($NE_1$, ..., $NE_i$, ..., $NE_j$, ..., $NE_N$) capable of running network-related processes and supported on a background IP network which comprises said network elements ($NE_1$, ..., $NE_i$, ..., $NE_j$, ..., $NE_N$) and at least one network elements controller ($NEC_1$, ..., $NEC_k$, ..., $NEC_Q$), the background IP network providing IP functional interfaces ($C_{ik}$) between the at least one network elements controller ($NEC_k$) and each network element ($NE_i$), and the target IP network having at least one network-related process been previously started for said at least one network element ($NE_i$);

the method comprising the steps of:

retrieving at the at least one network elements controller ($NEC_k$) at least one process information fragment written in a text-based information structured language for each network element ($NE_i$), said at least one process information fragment defining said at least one network-related process and being part of a target network configuration structure;

creating, by said at least one network elements controller ($NEC_k$), a command script for each network element ($NE_i$)) based on the target network configuration structure and to be executed at the corresponding network element ($NE_i$);

adding to the command script generated at the previous step at least a command for checking the status of said at least one network-related process, using the corresponding process information fragment;

adding, if at least one IP interface ($D_{ij}$) between two network elements ($NE_i$, $NE_j$) of the target IP network has been previously set, at least a command for pinging the IP interface ($D_{ij}$) to each of the two command scripts corresponding to said two network elements ($NE_i$, $NE_j$);

executing at the network element ($NE_i$) the command script for said network element ($NE_i$) in a remote mode, from the at least one network elements controller ($NEC_k$) and through the respective functional interface ($C_{ik}$).

13. Method for logical deployment of a target IP network comprising at least two network elements ($NE_1$, ..., $NE_i$, ..., $NE_j$, ..., $NE_N$) supported on a background IP network comprising said at least two network elements ($NE_1$, ..., $NE_i$, ..., $NE_j$, ..., $NE_N$) and at least one network elements controller ($NEC_1$, ..., $NEC_k$, $NEC_Q$), the background IP network providing IP functional interfaces ($C_{ik}$, $C_{jk}$) between the at least one network elements controller ($NEC_k$) and said at least two network elements ($NE_i$, $NE_j$), the method comprising the steps of:

retrieving at the at least one network elements controller ($NEC_k$) at least one IP networking information fragment written in a text-based information structured language for said at least two network elements ($NE_i$, $NE_j$), said at least one IP networking information fragment defining a IP networking layer for communication between said at least two network elements ($NE_i$, $NE_j$);

creating, by said at least one network elements controller ($NEC_k$), a command script for said at least two network elements ($NE_i$, $NE_j$);

adding at least a command for setting an IP interface ($D_{ij}$), being a first end of said IP interface ($D_{ij}$) at one network element ($NE_i$) and a second end of said IP interface ($D_{ij}$) at another network element ($NE_j$), to each command script corresponding to said two network elements ($NE_i$, $NE_j$);

executing at the two network elements ($NE_i$, $NE_j$) the command script for said two network elements ($NE_i$, $NE_j$) in a remote mode, from the at least one network elements controller ($NEC_k$) and through the corresponding functional interfaces ($C_{ik}$, $C_{jk}$) respectively.

14. Method for logical undeployment of a target IP network comprising at least two network elements ($NE_1$, ..., $NE_i$, ..., $NE_j$, ..., $NE_N$) supported on a background IP network comprising said at least two network elements ($NE_1$, ..., $NE_i$, ..., $NE_j$, ..., $NE_N$) and at least one network elements controller ($NEC_1$, ..., $NEC_k$, $NEC_Q$), the background IP network providing IP functional interfaces ($C_{ik}$, $C_{jk}$) between the at least one network elements controller ($NEC_k$) and said at least two network elements ($NE_i$, $NE_j$), and the target IP network providing at least one IP interface (Dij) previously set between said two network elements (NEi, NEj), having an IP address allocated at each end of said interface (Dij), said two ends corresponding to the two network elements ($NE_i$, $NE_j$);

the method comprising the steps of:
- retrieving at the at least one network elements controller ($NEC_k$) at least one IP networking information fragment written in a text-based information structured language for said at least two network elements ($NE_i$, $NE_j$), said at least one IP networking information fragment defining a IP networking layer for communication between said at least two network elements ($NE_i$, $NE_j$);
- creating, by said at least one network elements controller ($NEC_k$), a command script for said at least two network elements ($NE_i$, $NE_j$);
- adding to each command script corresponding to said two network elements ($NE_i$, $NE_j$) at least a command for unsetting the IP interface ($D_{ij}$) between said two network elements ($NE_i$, $NE_j$);
- executing at the two network elements ($NE_i$, $NE_j$) the command script for said two network elements ($NE_i$, $NE_j$) in a remote mode, from the at least one network elements controller ($NEC_k$) and through the corresponding functional interfaces ($C_{ik}$, $C_{jk}$) respectively.

15. Method for logical monitoring of a target IP network comprising at least two network elements ($NE_1$, ..., $NE_i$, ..., $NE_j$, ..., $NE_N$) supported on a background IP network comprising said at least two network elements ($NE_1$, ..., $NE_i$, ..., $NE_j$, ..., $NE_N$) and at least one network elements controller ($NEC_1$, ..., $NEC_k$, $NEC_Q$), the background IP network providing IP functional interfaces ($C_{ik}$, $C_{jk}$) between the at least one network elements controller ($NEC_k$) and said at least two network elements ($NE_i$, $NE_j$), and the target IP network providing at least one IP interface (Dij) previously set between said two network elements (NEi, NEj), having an IP address allocated at each end of said interface (Dij), said two ends corresponding to the two network elements ($NE_i$, $NE_j$);

the method comprising the steps of:
- retrieving at the at least one network elements controller ($NEC_k$) at least one IP networking information fragment written in a text-based information structured language for said at least two network elements ($NE_i$, $NE_j$), said at least one IP networking information fragment defining a IP networking layer for communication between said at least two network elements ($NE_i$, $NE_j$);
- creating, by said at least one network elements controller ($NEC_k$), a command script for said at least two network elements ($NE_i$, $NE_j$);
- adding to each command script corresponding to said two network elements ($NE_i$, $NE_j$) at least a command for pinging the IP interface ($D_{ij}$) between said two network elements ($NE_i$, $NE_j$);
- executing at the two network elements ($NE_i$, $NE_j$) the command script for said two network elements ($NE_i$, $NE_j$) in a remote mode, from the at least one network elements controller ($NEC_k$) and through the corresponding functional interfaces ($C_{ik}$, $C_{jk}$) respectively.

* * * * *